Dec. 20, 1955    C. E. MAGNUS    2,727,301
METHOD OF SOLDERING A LAP SIDE SEAM IN A CAN BODY
Filed Feb. 4, 1952
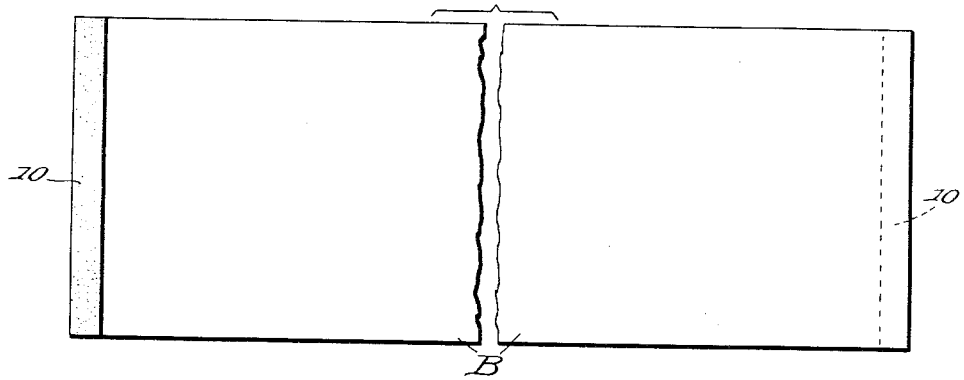
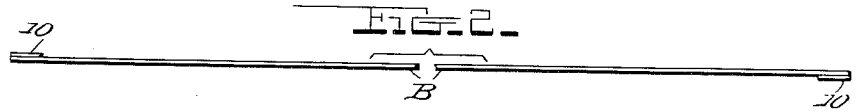
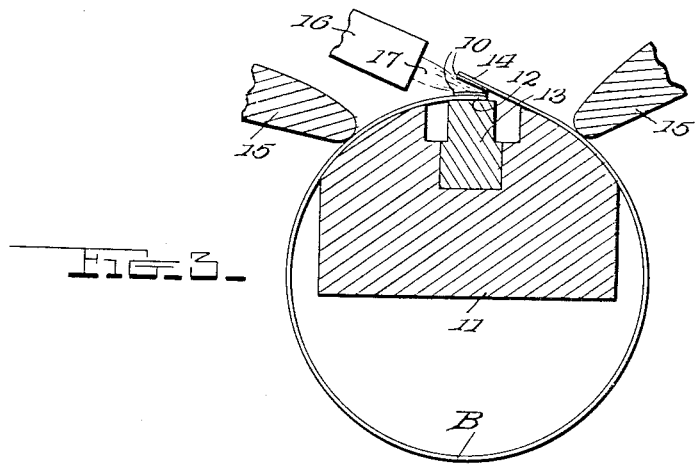
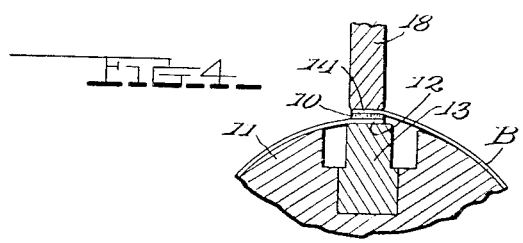
INVENTOR.
Carl Magnus
BY
Mason, Porter, Diller & Stewart
attys.

United States Patent Office 2,727,301
Patented Dec. 20, 1955

2,727,301

METHOD OF SOLDERING A LAP SIDE SEAM IN A CAN BODY

Carl E. Magnus, Chicago, Ill., assignor to Continental Can Company, Inc., New York, N. Y., a corporation of New York Application February 4, 1952, Serial No. 269,727

1 Claim. (Cl. 29—477)

The invention relates to new and useful improvements in a method of making side seams for metal can bodies and more particularly a side seam wherein the edge portions of the body blank are lapped and bonded together.

The present commercial method of bonding the lap side mean of a metal can body is to preheat the lap portions of metal that form the side seam and apply molten solder to the exterior of the can body along the edge of the outer lap portion, and depends upon the solder sweating into the seam between the heated lap portions. The amount of solder sweated into the seam is not uniform and often there are islands where there is no bonding material. If these islands are excessive or unduly large in area the seam will be weakened so that under strain it may break.

Furthermore, when solder is applied to the external surface of the can body only a relatively small portion of the solder sweats into the seam and the remainder adheres to the can body. Some of the surplus solder can be reclaimed by wiping rolls but at the best much solder is wasted and the wiping leaves an unsightly appearance. The use of the wiping rolls also brings its difficulties in that solder clings to the roll and is thrown therefrom by centrifugal force into the path of the approaching can bodies or is scraped by the can body from the roll and thus solder particles are lodged on the interior of the can body which is very objectionable especially when the inner face of the can body is lacquered. The heating of the lap portions of the side seam to a temperature sufficient to cause the solder to sweat into the seam has its disadvantages. Excessive heat is likely to distort and bring about a curvature of the side seam which is objectionable. If the outer face of the can body is decorated close to the side seam often there is a burning and discoloration of the lithography. When the coating is spaced away from the seam to avoid burning and discoloration, then it is the practice to spray lacquer the uncoated portion at the sides of the seam to prevent rust and cover unsightly portions which adds to the cost of manufacture of the can body.

An object of the invention is to provide a method of forming a bonded lap seam for metal can bodies wherein the bonding material is applied in a thin layer or strip to each end portion of the body blank while in the flat and so disposed thereon that in the formation of the body said bonding material will lie wholly within the limits of the side seam.

A further object of the invention is to provide a method of bonding a side seam of the above type wherein the blank is shaped into body form with the bonding strips in juxtaposition but spaced from each other, and heat is applied to the exposed surfaces of the bonding strips for a time sufficient to cause said surfaces to become molten after which the molten surfaces are pressed together and held under pressure until the bonding material is cooled and the bond set.

In the drawings which illustrate more or less diagrammatically the improved method steps employed in solder bonding the side seam of a lap seam metal can body:

Figure 1 is a plan view of a body blank to which a relatively thin layer or strip of bonding material has been applied to each end of the body blank and on opposite faces thereof;

Figure 2 is an edge view of the body blank;

Figure 3 is a view showing the body blank bent into body form with the bonding strips in juxtaposition but spaced from each other at the entrance side of the seam and heat being applied directly to the exposed faces of the bonding strips to render the same molten; and Figure 4 is a view showing the molten faces of the bonding strips pressed into engagement with each other where it is held pressed until the bonding material cools and sets.

In the carrying out of the method solder is preferably used as bonding material and will be so referred to throughout the following description.

In Figures 1 and 2 of the drawing the body blank B, is shown with a thin layer of solder 10 at each end thereof. The solder strip can be applied in any well known manner as by squirting a fine stream of molten solder thereon so that it amalgamates with the thin coating or forms a good solder bonded connection with the base metal forming the body blank. This thin coating of solder which has been bonded to the body blank is so disposed thereon that when the blank is shaped into body form as shown in Figure 3 the solder strips will lie wholly within the lap portions of the body blank which are to be bonded together to form the side seam.

As shown in Figure 3, the body is shaped about a horn 11 and the inner lap portion 12 lies in contact with an anvil 13 carried by the horn. The outer lap section 14 of the body blank B has not been folded down into contact with the inner lap section but extends at an acute angle thereto. The solder strips are in juxtaposition but spaced from each other at the entrance side of the seam. The body blank is held on the horn by clamping devices 15, 15. While the body blank is in the shape shown in Figure 3, heat is applied to the exposed faces of the solder strips. This, as shown in the drawing, is accomplished by a burner 16 of the usual type positioned so as to direct a flame 17 directly against the opposed faces of the solder strip. The heating flame practically contacts only the solder faces. Heat is applied for a time sufficient to cause these surfaces of the solder strips to become molten, after which the heating is discontinued and the outer lap section pressed against the inner lap section by a presser member 18. This will bring the molten surfaces into contact and while held under pressure the seam parts are cooled so that the molten solder becomes welded together. The amount of heat used is only enough to heat the solder surfaces and when the heat is removed after bringing the surfaces together the retained heat in the solder bond is dissipated and some of it penetrates through the solder layer into the metal of the can body in the process of cooling the bonded surfaces but never enough to raise the temperature of any part except the solder surfaces to the melting point of solder.

The solder surfaces when melted have a perfect affinity for each other and unite without the use of flux to form a homogeneous layer between the surfaces of the solder strips that have already been bonded to the can body blank in the flat as a pre-soldering treatment. In the improved method the amount of solder employed in the bonding of the lap sections together is very much less than that employed in the method wherein the molten solder is applied to the body and sweat into the side seam. Distortion, discoloration, burned lacquer, excessive solder and solder splash are all avoided in the present method; neither is there any need of outside side stripping the unlacquered or unlithographed areas near the side seam.

While solder has been desribed as the preferred bonding material it is obvious that other types of bonding material may be used. It is also obvious that minor changes in the method step illustrated may be made without departing from the spirit of the invention set forth in the appended claim.

I claim:

The method of making a lap seam metal can body comprising bonding a thin solder strip to the inner face of each portion of the body blank which portions are to be lapped to form the side seam, shaping the body blank into body form and lapping the edge portions so as to bring the solder strips into opposed relation but spaced sufficiently from each other along the edge of the outer lap portion to provide an entrance to the side seam, directing heat through said entrance onto the opposed faces of the solder strip for a time sufficient to render the surface portions of the strips molten and pressing the molten faces of the strips together and cooling the same for joining the lap portions into a solder bonded side seam.

References Cited in the file of this patent

UNITED STATES PATENTS

| | | |
|---|---|---|
| 1,114,508 | Norton | Oct. 20, 1914 |
| 2,623,273 | Murray et al. | Dec. 30, 1952 |
| 2,657,660 | Crowe | Nov. 3, 1953 |